United States Patent
Duan et al.

(10) Patent No.: US 10,125,866 B2
(45) Date of Patent: Nov. 13, 2018

(54) TRANSMISSION FOR A POWERTRAIN SYSTEM

(71) Applicant: GM GLOBAL TECHNOLOGY OPERATIONS LLC, Detroit, MI (US)

(72) Inventors: Chengwu Duan, Shanghai (CN); Farzad Samie, Franklin, MI (US); Chunhao J. Lee, Troy, MI (US); Jian Yao, Shanghai (CN)

(73) Assignee: GM Global Technology Operations LLC, Detroit, MI (US)

( * ) Notice: Subject to any disclaimer, the term of this patent is extended or adjusted under 35 U.S.C. 154(b) by 320 days.

(21) Appl. No.: 15/074,280

(22) Filed: Mar. 18, 2016

(65) Prior Publication Data
US 2017/0268669 A1    Sep. 21, 2017

(51) Int. Cl.
*F16H 37/02*    (2006.01)
*F16H 61/70*    (2006.01)
*F16H 61/664*   (2006.01)

(52) U.S. Cl.
CPC ......... *F16H 61/702* (2013.01); *F16H 37/022* (2013.01); *F16H 61/6646* (2013.01); *F16H 2200/2005* (2013.01); *F16H 2200/2035* (2013.01); *F16H 2200/2064* (2013.01); *F16H 2200/2066* (2013.01); *F16H 2200/2082* (2013.01); *F16H 2200/2094* (2013.01)

(58) Field of Classification Search
CPC ............. F16H 37/022; F16H 2037/026; F16H 2200/2005; F16H 2200/2035
See application file for complete search history.

(56) References Cited

U.S. PATENT DOCUMENTS

| 5,427,579 A * | 6/1995 | Kanehara | F16H 37/022 474/28 |
| 8,961,350 B1 * | 2/2015 | Mellet | F16H 37/022 475/210 |
| 2014/0335981 A1 * | 11/2014 | Kadokawa | F16H 9/18 474/8 |
| 2015/0045183 A1 * | 2/2015 | Aichi | F16H 59/18 477/37 |
| 2015/0233458 A1 * | 8/2015 | Garcia | F16H 37/022 475/66 |
| 2016/0052522 A1 * | 2/2016 | Matsuo | F16H 61/0262 74/664 |

* cited by examiner

*Primary Examiner* — Edwin A Young
(74) *Attorney, Agent, or Firm* — Quinn IP Law

(57) ABSTRACT

A transmission variator includes a first pulley rotatably attached to an intermediate member of a geartrain, and a second pulley rotatably attached to an output member that is rotatably coupled to the driveline. The geartrain includes an input member, a planetary gear set, a first clutch, a second clutch and an intermediate member. The second clutch is a low drag clutch. The input member rotatably couples to the prime mover. A controller includes an instruction set that is executable to activate only the first clutch in response to a request to operate the driveline in a forward direction, and activate only the second clutch in response to a request to operate the driveline in a reverse direction.

18 Claims, 3 Drawing Sheets

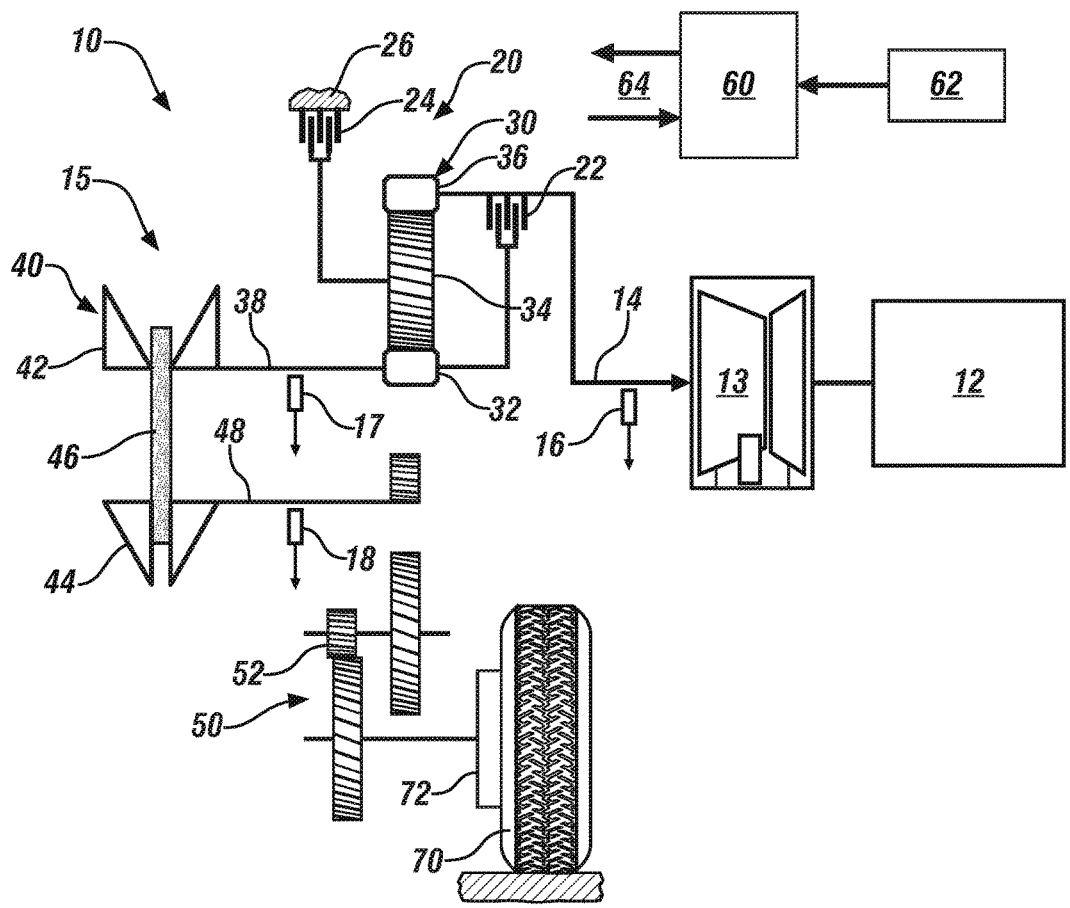
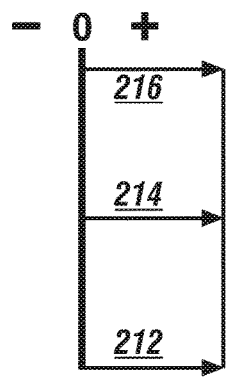 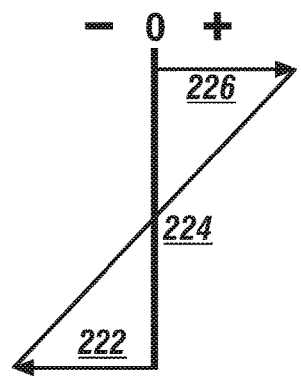 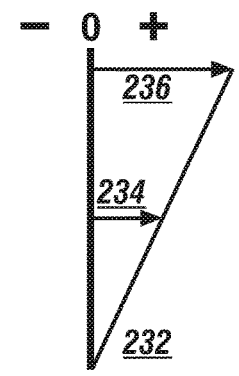
FIG. 2-1　　FIG. 2-2　　FIG. 2-3

TRANSMISSION FOR A POWERTRAIN SYSTEM

TECHNICAL FIELD

This disclosure relates to a powertrain system including a transmission having a variator, and a method and control routine associated therewith.

BACKGROUND

Powertrains having an internal combustion engine coupled to a variator of continuously or infinitely variable transmission (CVT) may be employed to provide tractive effort in vehicles. A variator is capable of continuously changing an output/input speed ratio over a range between a minimum (underdrive) ratio and a maximum (overdrive) ratio, thus permitting infinitely variable selection of engine operation that achieves a preferred balance of fuel consumption and engine performance in response to an output torque request.

Known chain-type variators may be composed of two pulleys with a continuous belt or chain running therebetween, wherein sheaves of each of the pulleys sandwich the chain. Frictional engagement between the sheaves of the pulleys and the chain couples the chain to each of the pulleys to transfer torque from one pulley to the other. One of the pulleys may operate as a drive or input pulley and the other pulley may operate as a driven or output pulley. The speed ratio may be changed by urging the two sheaves of one of the pulleys closer together and urging the two sheaves of the other pulley farther apart, causing the chain to ride higher or lower on the respective pulley.

SUMMARY

A transmission disposed to transfer mechanical power between a prime mover and a driveline is described and includes a geartrain, a variator and a controller. The variator includes a first pulley rotatably attached to a second pulley via a flexible continuous device, wherein the first pulley rotatably attaches to the intermediate member of the geartrain and the second pulley rotatably attaches to an output member that rotatably couples to the driveline. The geartrain includes an input member, a planetary gear set, a first clutch, a second clutch and an intermediate member. The second clutch is a low drag clutch. The input member rotatably couples to the prime mover. The controller includes a processor and an instruction set, and is operatively connected to the variator, the first clutch and the second clutch, and in communication with a first sensor disposed to monitor rotational speed associated with the input member and a second sensor disposed to monitor rotational speed associated with the intermediate member. An instruction set is executable to activate only the first clutch in response to a request to operate the driveline in a forward direction, and activate only the second clutch in response to a request to operate the driveline in a reverse direction.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIG. 1 schematically illustrates elements of a first embodiment of a powertrain system that includes a prime mover that is rotatably coupled via an input member to a geartrain and a variator, in accordance with the disclosure;

FIGS. 2-1, 2-2, and 2-3 are speed vector diagrams that graphically illustrate rotational speeds of a ring gear, a carrier and a sun gear of a planetary gear set of the geartrain when operating the geartrain in a first state, a second state and a neutral state, respectively, in accordance with the disclosure;

FIGS. 3-1 and 3-2 schematically show first and second processes, respectively for shifting an embodiment of the transmission from Drive to Reverse when the output member is rotating, in accordance with the disclosure.

DETAILED DESCRIPTION

Figures 1, 3:
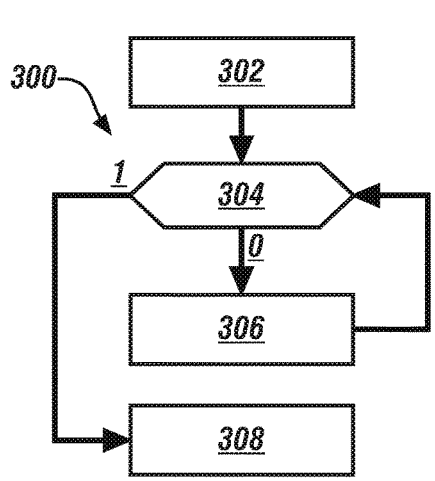

Referring now to the drawings, wherein the depictions are for the purpose of illustrating certain exemplary embodiments only and not for the purpose of limiting the same, FIG. 1 schematically illustrates a powertrain system 10 that may be advantageously employed on a mobile platform to provide propulsion effort. The powertrain system 10 preferably includes a prime mover 12 that is rotatably coupled via an input member 14 to a transmission 15 that includes a geartrain 20 and a variator 40, all of which may be operatively controlled by a controller 60. An output member 48 of the variator 40 rotatably couples to a driveline 50, wherein the driveline 50 may include speed reduction gears 52, a transaxle and/or a differential gear set that rotatably couples to one or more drive wheels 70. Each of the drive wheels and other vehicle wheels is preferably equipped with a controllable brake 72. The mobile platform may include, by way of non-limiting examples, a passenger vehicle, a light-duty or heavy-duty truck, a utility vehicle, an agricultural vehicle, an industrial or warehouse vehicle, or a recreational off-road vehicle.

The prime mover 12 may be an internal combustion engine, an electric motor, a pneumatic motor or another device that transforms stored energy into rotational power that may be transferred to the geartrain 20. When the prime mover 12 is an internal combustion engine, it may be any suitable internal combustion engine capable of transforming hydrocarbon fuel to mechanical power to generate torque in response to commands originating from the controller 60. The internal combustion engine 12 may be coupled to the input member 14 of the geartrain 20 via a torque converter 13, which is a device providing fluidic coupling between its input and output members for transferring torque, and preferably including a pump, a turbine and a controllable torque converter clutch that locks rotation of the pump and turbine. In some embodiments, the torque converter 13 may be omitted.

The geartrain 20 preferably includes input member 14, a meshed planetary gear set 30, a first torque transfer clutch 22, a second torque transfer clutch 24 and an intermediate member 38, all of which is housed in a transmission case 26 that is mounted onto a frame member or at another suitable location of the vehicle. The planetary gear set 30 preferably includes a ring gear 36, a plurality of planet gears and carrier 34, and a sun gear 32. The ring gear 36 rotatably couples to the input member 14 and the sun gear 32 rotatably couples to the intermediate member 38. The planetary gear set 30 may be replaced with another suitable gearing mechanism that provides reduction gearing between the input member 14 and the intermediate member 38 and functions in a manner described herein. The first torque transfer clutch 22 may be any suitable clutch, and is a multi-plate friction clutch in certain embodiments. The second torque transfer clutch 24 preferably is a low drag friction clutch.

When the geartrain 20 is operating in a first state, the sun gear 32 and the ring gear 36 rotate in the same rotational direction such that the rotational direction of the intermediate member 38 is the same as the rotational direction of the input member 14. Operating the geartrain 20 in the first state includes operating with the first clutch 22 activated and with the second clutch 24 deactivated. As such, the output member 48 of the variator 40 rotates the driveline 50 to rotate the drive wheel(s) 70 to effect propulsion in a forward direction when the powertrain system 10 is employed on a vehicle. This operation is shown with reference to FIG. 2-1, which graphically illustrates a speed vector diagram including rotational speeds 216, 214 and 212 of the ring gear 36, the carrier 34 and the sun gear 32, respectively when operating the geartrain 20 in the first state. As indicated, the rotational direction (+) and rotational speeds 212, 214, 216 of the sun gear 32, carrier 34 and ring gear 36, respectively, are equal when operating the geartrain 20 in the first state. Operating in the first state is analogous to operating in a forward direction, e.g., Drive.

When the geartrain 20 is operating in a second state, the sun gear 32 and the ring gear 36 rotate in opposite rotational directions such that the rotational direction of the intermediate member 38 is opposed to the rotational direction of the input member 14. Operating the geartrain 20 in the second state includes operating with the first clutch 22 deactivated and with the second clutch 24 activated. As such, the output member 48 of the variator 40 rotates the driveline 50 to rotate the drive wheel(s) 70 to effect propulsion in a reverse direction when the powertrain system 10 is employed on a vehicle. This operation is shown with reference to FIG. 2-2, which graphically illustrates a speed vector diagram that includes rotational speeds 226, 224 and 222 of the ring gear 36, the carrier 34 and the sun gear 32, respectively, when operating the geartrain 20 in the second state. As indicated, the rotational direction (+) of the ring gear 36 is opposite to the rotational direction (−) of the sun gear 32. As indicated, the rotational speed 226 of the ring gear 36 is the same magnitude as the rotational speed 222 of the sun gear 32. As indicated, the carrier 34 is not rotating. Operating in the second state is analogous to operating in a reverse direction, e.g., Reverse.

When the geartrain 20 is operating in a neutral state, the sun gear 32, the ring gear 36 and the carrier 34 rotate independently. Operating the geartrain 20 in the neutral state includes operating with both the first clutch 22 and the second clutch 24 deactivated. As such, the intermediate member 38 is decoupled from rotation of the input member 14. This operation is shown with reference to FIG. 2-3, which graphically illustrates a speed vector diagram that includes rotational speeds 236, 234 and 232 of the ring gear 36, the carrier 34 and the sun gear 32, respectively, when operating the geartrain 20 in the neutral state. As indicated, the rotational direction (+) of the ring gear 36 is the same as the rotational direction (+) of the carrier 34, and the magnitude of the rotational speed 236 of the ring gear 36 may be determined in relation to the rotational speed 234 of the carrier 34 based upon the gear ratio. As indicated, the sun gear 32 is not rotating, i.e., its rotational speed 232 is 0.

In one embodiment, the sun gear 32 is not rotating, and the carrier 34 and the ring gear 36 rotate in the same rotational direction such that the intermediate member 38 is not rotating when the geartrain 20 is operating in a neutral state, wherein operating the geartrain 20 in the neutral state includes operating with both the first clutch 22 and the second clutch 24 deactivated.

In certain embodiments, the variator 40 is composed of a primary pulley 42 rotatably coupled to a secondary pulley 44 via a flexible continuous device 46 that transfers torque therebetween. The first pulley 42 rotatably attaches to the intermediate member 38 and the second pulley 44 rotatably attaches to the output member 48, and is adapted to transfer torque between the first and second pulleys 42, 44 and thus between the intermediate member 38 and the output member 48. In one embodiment, a hydraulic pump fluidly couples to elements of the variator 40 to supply pressurized hydraulic fluid via a hydraulic circuit in response to control signals that are communicated from the controller 60.

The first pulley 42 and intermediate member 38 rotate about a first axis, and the second pulley 44 and output member 48 rotate about a second axis. The continuous device 46 may be a belt, a chain, or another suitable flexible continuous device. An intermediate speed sensor 17 is preferably arranged to monitor rotation of the intermediate member 38 to generate a variator input speed that relates to a speed of the primary pulley 42, and an output speed sensor 18 may be mounted near the output member 48 to generate a variator output speed that relates to a speed of the second pulley 44. One of the first and second pulleys 42, 44 acts as a ratioing pulley to establish a speed ratio and the other of the first and second pulleys 42, 44 acts as a clamping pulley to generate sufficient clamping force to transfer torque therebetween. As used herein, the term 'speed ratio' refers to a variator speed ratio, which is a ratio of a variator output speed and a variator input speed. The variator input speed may be determined based upon a signal input from one of an input speed sensor 16, an intermediate speed sensor 17 as described herein, or a signal input from another suitable speed/position sensor. The speed/position sensors described herein may employ any suitable speed/position sensing technology, such as Hall effect devices, resolvers, magnetostrictive devices, etc. The variator output speed may be determined based upon a signal input from the output speed sensor 18 as described herein, or a wheel speed sensor, or another suitable speed/position sensor. An underdrive speed ratio occurs when rotational speed of the variator output speed is less than the rotational speed of the variator input speed, and an overdrive speed ratio occurs when rotational speed of the variator output speed is greater than the rotational speed of the variator input speed.

In certain embodiments, the first pulley 42 may be split perpendicular to the first axis to define an annular first groove that is formed between a moveable sheave and a stationary sheave. The moveable sheave axially moves or translates along the first axis relative to the stationary sheave. For example, the moveable first sheave may be attached to the intermediate member 38 via a splined connection, thereby allowing axial movement of the moveable first sheave along the first axis. The stationary first sheave is disposed opposite the moveable first sheave. The stationary first sheave is axially fixed to the intermediate member 38 along the first axis. As such, the stationary first sheave does not move in the axial direction of the first axis. The moveable first sheave and the stationary first sheave each include a first groove surface. The first groove surfaces of the moveable first sheave and the stationary first sheave are disposed opposite each other to define the annular first groove therebetween. The opposed first grooved surfaces preferably form an inverted frustoconical shape such that a movement of the moveable first sheave towards the stationary first sheave increases an outer pulley diameter of the annular first groove. An actuator is arranged with the first pulley to control an axial position of the moveable first sheave in response to a drive signal, including urging the moveable first sheave towards the stationary first sheave. In one embodiment, the actuator is a hydraulically-controlled device, e.g., a valve that fluidly couples to the hydraulic circuit and the drive signal is a hydraulic pressure signal.

The second pulley 44 may be split perpendicular to the second axis to define an annular second groove therebetween. The annular second groove is disposed perpendicular to the second axis. The second pulley 44 includes a moveable sheave and a stationary sheave. The moveable sheave axially moves or translates along the second axis relative to the stationary sheave. For example, the moveable second sheave may be attached to the output member 48 via a splined connection, thereby allowing axial movement of the moveable second sheave along the second axis. The stationary second sheave is disposed opposite the moveable second sheave. The stationary second sheave is axially fixed to the output member 48 along the second axis. As such, the stationary second sheave does not move in the axial direction of the second axis. The moveable second sheave and the stationary second sheave each include a second groove surface. The second groove surfaces of the moveable second sheave and the stationary second sheave are disposed opposite each other to define the annular second groove therebetween. The opposed second grooved surfaces preferably form an inverted frustoconical shape such that a movement of the moveable second sheave towards the stationary second sheave increases an outer pulley diameter of the annular second groove. An actuator may be arranged with the second pulley to control an axial position of the moveable second sheave in response to a driven signal, including urging the moveable second sheave towards the stationary second sheave. In one embodiment, the actuator is a hydraulically-controlled device, e.g., a valve that fluidly couples to the hydraulic circuit, and the drive signal is a hydraulic pressure signal. A ratio of the outer pulley diameter of the first pulley 42 and the outer pulley diameter of the second pulley 44 defines a transmission torque ratio. Other elements, such as clutch assemblies in the form of selectable one-way clutches and the like may be deployed between the variator 40 and other powertrain and driveline components and systems.

The controller 60 is shown as a single device for ease of illustration. Those skilled in the art appreciate that the controller 60 may be a unitary controller or a plurality of controllers that are disposed to control operation of various elements of the powertrain system 10. By way of non-limiting examples, there may one or multiple controllers that are arranged to monitor and control operation of the prime mover 12, and one or multiple controllers that are arranged to monitor and control operation of the transmission 15.

The controller 60 monitors signal inputs from the input speed sensor 16, the output speed sensor 18 and a transmission range selector 62, and executes control routines to control activations of the first clutch 22 and the second clutch 24, and to control operation of the variator 40. The transmission range selector 62 is an operator-manipulable device through which a vehicle operator commands operation of the powertrain system 10 in one of a plurality of propulsion states including, e.g., Park, Reverse, Neutral and Drive, and may be referred to as a PRNDL selector. The transmission range selector 62 may include a tip-up/tip-down selector in certain embodiments. The transmission 15 may be commanded to shift its propulsion state in response to an operator input to the transmission range selector 62. Alternatively, the transmission 15 may be commanded to shift its propulsion state via an autonomous vehicle driving control routine. Hardware, control routines and systems related to commanding a transmission to shift its propulsion state during autonomous vehicle driving are known to those skilled in the art.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory components in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be executed at regular intervals, for example each 100 microseconds during ongoing operation. Alternatively, routines may be executed in response to occurrence of a triggering event. Communication between controllers, and communication between controllers, actuators and/or sensors may be accomplished using a direct wired point-to-point link, a networked communication bus link, a wireless link or any other suitable communication link, and is indicated by lines 64. Communication includes exchanging data signals in any suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to any physically discernible indicator that conveys information, and may be any suitable waveform (e.g., electrical, optical, magnetic, mechanical or electromagnetic), such as DC, AC, sinusoidal-wave, triangular-wave, square-wave, vibration, and the like, that is capable of traveling through a medium.

The controller 60 controls operation of the powertrain system 10 including the transmission 15 and the geartrain 20 that employs a compact, low drag clutch such as the second torque transfer clutch 24. When the transmission 15 is commanded to shift to a Park or Neutral state via the transmission range selector 62, the controller 60 effects such operation by deactivating the first clutch 22 and deactivating the second clutch 24, allowing it to freewheel. When the transmission 15 is commanded to shift from Park or Neutral to effect propulsion in a forward direction of travel, e.g., by commanding operation in Drive via the transmission range selector 62, the controller 60 activates the first clutch 22. When the transmission 15 is commanded to shift from Park or Neutral to effect propulsion in a reverse direction, e.g., by commanding operation in Reverse via the transmission range selector 62, the controller 60 initially activates the first clutch 22 to stop rotation of the carrier 34 and then activates the second clutch 24 to ground rotation of the carrier 34 to the transmission case 26, and then deactivates the first clutch 22. When the transmission 15 is commanded to shift from Drive to Reverse when the output member 48 is not rotating, i.e., when the vehicle is in a non-moving state, the controller 60 deactivates the first clutch 22 and activates the second clutch 24 to ground rotation of the carrier 34 to the transmission case 26. When the transmission 15 is commanded to shift from Reverse to Drive when the output member 48 is not rotating, i.e., when the vehicle is in a non-moving state, the controller 60 deactivates the second clutch 24 and activates the first clutch 22. When the transmission 15 is commanded to shift from Drive to Reverse when the output member 48 is rotating, i.e., when the vehicle is in a moving state, the controller 60 deactivates the first clutch 22 and activates the second clutch 24 to ground rotation of the carrier 34 to the transmission case 26. Inertia for stopping rotation of elements to permit synchronization and engagement of the second clutch 24 may be supplied through the ring gear 36 and the torque converter 13. When the carrier 34 speed is greater than a threshold speed, assistance from the brake 72 may be employed to reduce vehicle speed before activating the second clutch 24.

FIG. 3-1 schematically shows a first process 300 for shifting an embodiment of the transmission 15 from Drive to Reverse when the output member 48 is rotating. The first process 300 is compelled to execute when a shift from Drive to Reverse is commanded (302). This preferably includes monitoring a first speed that is associated with the input member 14, and monitoring a second speed that is associated with the intermediate member 38, e.g., from the intermediate speed sensor 17. The first and second speeds are evaluated to determine whether synchronized activation of the second clutch 24 is permitted (304). Activation of the second clutch 24 may be permitted when the second or intermediate speed sensor 17 indicates the intermediate member 38 is not rotating or is rotating at a low speed that is less than a threshold speed. The threshold speed is a maximum permissible speed for activation of the elements of the second clutch 24 based upon synchronization characteristics and other factors associated with the second clutch 24, and is application-specific. When synchronized activation of the second clutch 24 is prohibited (304)(0), some form of vehicle wheel braking is applied, e.g., to the brake 72, to adjust the speed of the intermediate member 38 (306). When the input speed and the intermediate speed permit synchronized activation of the second clutch 24 (304)(1), the second clutch 24 is activated and the shift from Drive to Reverse is completed (308).

Figures 2, 3:
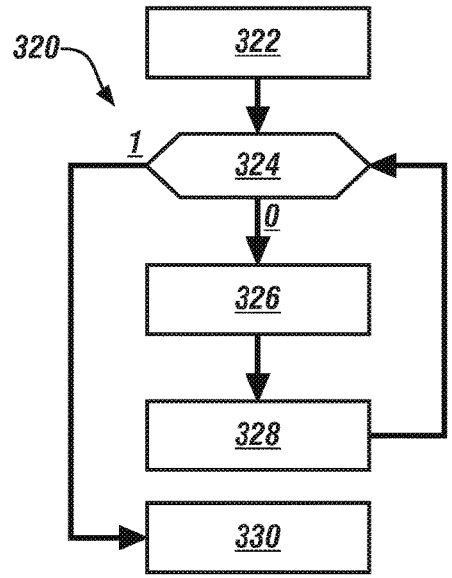

FIG. 3-2 schematically shows a second process 320 for shifting an embodiment of the transmission 15 from Drive to Reverse when the output member 48 is rotating. The second process 320 is compelled to execute when a shift from Drive to Reverse is commanded (322). This preferably includes monitoring a first speed that is associated with the input member 14, e.g., from the input speed sensor 16, and monitoring a second speed that is associated with the intermediate member 38, e.g., from the intermediate speed sensor 17. The first and second speeds are evaluated to determine whether synchronized activation of the second clutch 24 is permitted (324). Activation of the second clutch 24 may be permitted when the second or intermediate sensor 17 indicates the intermediate member 38 is not rotating or rotating at a low speed that is less than the threshold speed. When synchronized activation of the second clutch 24 is prohibited (324)(0), the variator 40 may be commanded to transition from an underdrive speed ratio to an overdrive speed ratio (326), and the first and second speeds associated with the second clutch 24 may be recalculated (328). Commanding a transition from an underdrive speed ratio to an overdrive speed ratio may effectively change the rotational speed of the intermediate member 38 by an amount that is sufficient to synchronize the elements of the second clutch 24. This may be independent from or in combination with applying, via a command from the controller 60 to the brake 72 to adjust the speed of the intermediate member 38. When the input speed and the intermediate speed permit synchronized activation (324)(1), the second clutch 24 is activated and the shift from Drive to Reverse is completed (330). When the transmission 15 is commanded to shift from Reverse to Drive when the output member 48 is rotating, i.e., when the vehicle is in a moving state, the controller 60 activates the first clutch 22 and deactivates the second clutch 24. The second clutch 24 may overrun without effect during the activation of the first clutch 22.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

Figure 4:
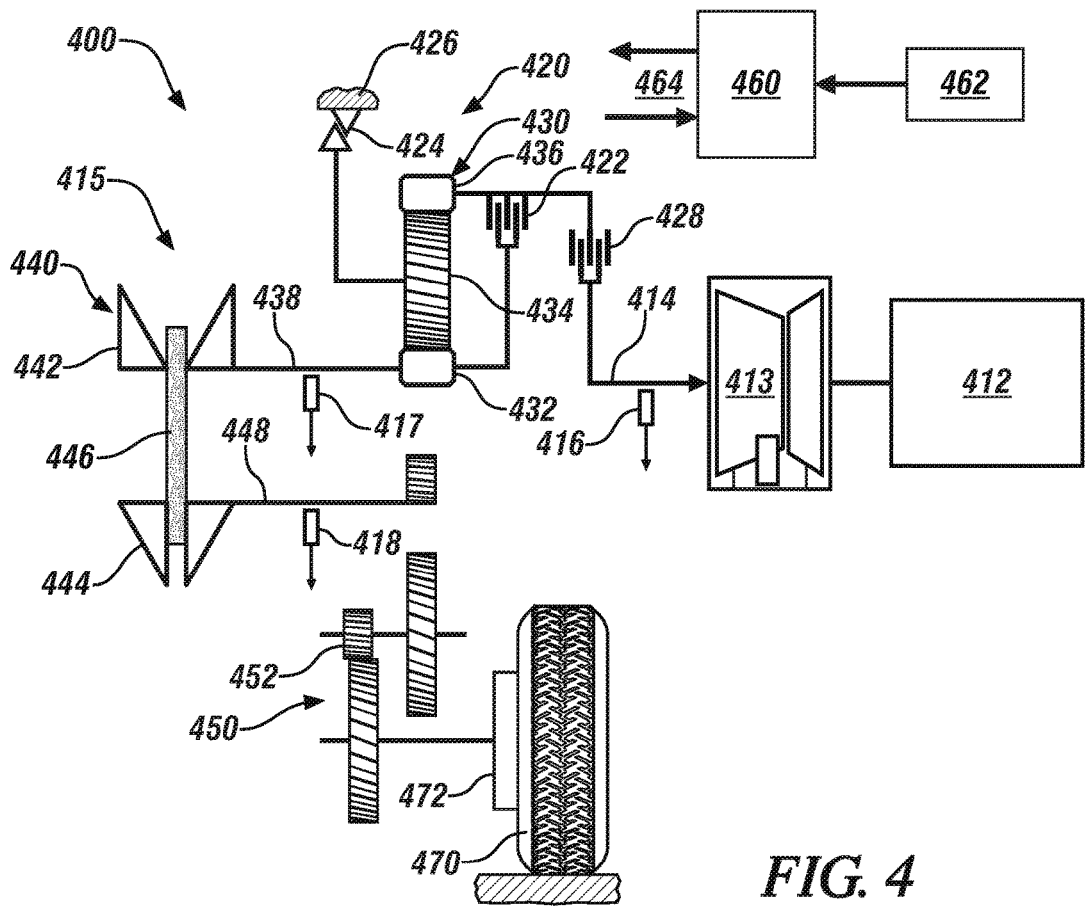
FIGS. 4 and 5 schematically illustrate elements of embodiments of a powertrain system that includes prime mover that is rotatably coupled via an input member to a geartrain and a variator, in accordance with the disclosure.

FIG. 4 schematically illustrates a powertrain system 400 that may be advantageously employed on a mobile platform to provide propulsion effort, and is analogous to the powertrain system 10 described with reference to FIG. 1. The powertrain system 400 preferably includes an internal combustion engine 412 that is rotatably coupled via input member 414 to transmission 415 that includes geartrain 420 and variator 440, all of which may be operatively controlled by controller 460 via communication lines 464. Output member 448 of the variator 440 rotatably couples to driveline 452, wherein the driveline 452 may include speed reduction gears, a transaxle and/or a differential gear set that rotatably couples to one or more drive wheels 470. Each of the drive wheels 470 and other vehicle wheels is preferably equipped with a controllable brake 472. The internal combustion engine 412 may be coupled to the input member 414 of the geartrain 420 via torque converter 413 and a third torque transfer clutch 428. The geartrain 420 preferably includes input member 414, meshed planetary gear set 430, a first torque transfer clutch 422, a second torque transfer clutch 424, the third torque transfer clutch 428 and an intermediate member 438, all of which is housed in transmission case 426 that is mounted onto a frame member or at another suitable location of the vehicle. The third torque transfer clutch 428 is able to decouple the internal combustion engine 412 from the input member 414 when deactivated, and thus facilitate Neutral. The planetary gear set 430 preferably includes ring gear 436, a plurality of planet gears and carrier 434, and sun gear 432. The ring gear 436 rotatably couples to the input member 414 and the sun gear 432 rotatably couples to the intermediate member 438. The first and third torque transfer clutches 422, 428 may be any suitable clutch, and are multi-plate friction clutches in certain embodiments. The second torque transfer clutch 424 is a selectable one-way clutch (SOWC) in this embodiment. By way of a non-limiting descriptive example, a SOWC clutch is a low friction device that may include an inner race, an outer race, one or multiple selector plates, a plurality of moveable struts in the inner race and a corresponding plurality of pockets in the outer race. When the selector plates are in a first position, the struts engage the pockets to transfer torque between the inner and outer races in a first rotational direction, and permit overrunning in the second, opposed rotational direction. When the selector plates are in a second position, the struts engage the pockets to transfer torque between the inner and outer races in the second, opposed rotational direction, and permit overrunning in the first rotational direction. In certain embodiments, rotational speeds of the inner and outer races are preferably synchronized before the selector plates are moved to permit the struts to engage the pockets to effect torque transfer. When the selector plates are in a third position, the struts are disengaged from the pockets and no torque is transferred in either the first or the second, opposed rotational directions. This may be referred to as a freewheeling mode. Low drag clutches, such as SOWCs, dog clutches and the like are known to those skilled in the art.

The variator 440 is analogous to the variator 40 described with reference to FIG. 1, and includes a primary pulley 442 rotatably coupled to a secondary pulley 444 via a flexible continuous device 446 that transfers torque therebetween. The first pulley 442 rotatably attaches to the intermediate member 438 and the second pulley 444 rotatably attaches to the output member 448, and is adapted to transfer torque between the first and second pulleys 442, 444 and thus between the intermediate member 438 and the output member 448. In one embodiment, a hydraulic pump fluidly couples to elements of the variator 440 to supply pressurized hydraulic fluid via a hydraulic circuit in response to control signals that are communicated from the controller 460. The controller 460 is analogous to the controller 60 described with reference to FIG. 1. The controller 460 monitors signal inputs from an input speed sensor 416, an intermediate speed sensor 417, an output speed sensor 418 and a transmission range selector 462, and executes control routines to control activations of the first clutch 422, the second clutch 424 and the third clutch 428, and to control operation of the variator 440.

Operation of the geartrain 420 is analogous to the operation of geartrain 20 that is described with reference to FIGS. 2-1, 2-2 and 2-3. When the geartrain 420 is operating in a first state, the sun gear 432 and the ring gear 436 rotate in the same rotational direction such that the rotational direction of the intermediate member 438 is the same as the rotational direction of the input member 414. Operating the geartrain 420 in the first state includes operating with the first clutch 422 activated and with the second clutch 424 deactivated. As such, the output member 448 of the variator 440 rotates the driveline 452 to rotate the drive wheel(s) 470 to effect propulsion in a forward direction when the powertrain system 400 is employed on a vehicle. When the geartrain 420 is operating in a second state, the sun gear 432 and the ring gear 436 rotate in opposite rotational directions such that the rotational direction of the intermediate member 438 is opposed to the rotational direction of the input member 414. Operating the geartrain 420 in the second state includes operating with the first clutch 422 deactivated and with the second clutch 424 activated. As such, the output member 448 of the variator 440 rotates the driveline 452 to rotate the drive wheel(s) 470 to effect propulsion in a reverse direction when the powertrain system 400 is employed on a vehicle. When the geartrain 420 is operating in Neutral, the sun gear 432 is not rotating, and the ring gear 436 and the carrier 434 rotate in the same rotational direction. Operating the geartrain 400 in the neutral state includes operating with both the first clutch 422 and the second clutch 424 deactivated. As such, the intermediate member 438 is decoupled from rotation of the input member 414. The third clutch 428 permits operation that includes disconnecting engine torque from the geartrain 420, which facilitates having the second clutch 424 be a low drag clutch such as an SOWC.

The geartrain 400 operates in Neutral/Park by activating the second clutch 424 and deactivating the first and third torque transfer clutches 422 and 428. The geartrain 400 transitions from Neutral/Park to Reverse by activating the third clutch 428. The geartrain 400 transitions from Neutral/Park to Drive by deactivating the second clutch 424 and activating the first and third clutches 422, 428. The geartrain 400 transitions from Reverse to Drive by deactivating the second clutch 424 and activating the first clutch 422 with the third clutch 428 continuously activated. The geartrain 400 transitions from Drive to Reverse by deactivating the first and third clutches 422, 428, activating the second clutch 424 and then re-activating the third clutch 428.

Figure 5:
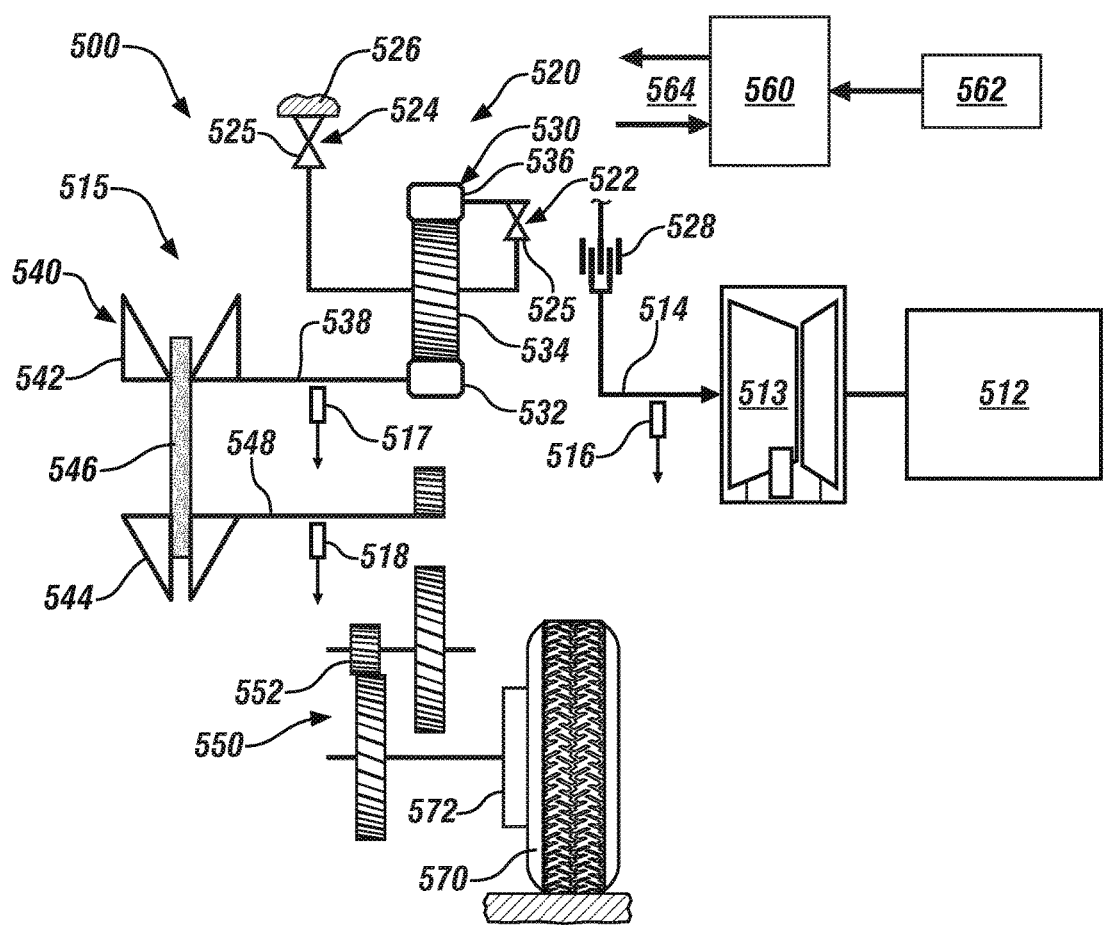

FIG. 5 schematically illustrates a powertrain system 500 that may be advantageously employed on a mobile platform to provide propulsion effort, and is analogous to the powertrain system 10 described with reference to FIG. 1. The powertrain system 500 preferably includes an internal combustion engine 512 that is rotatably coupled via input member 514 to transmission 515 that includes geartrain 520 and variator 540, all of which may be operatively controlled by controller 560 via communication lines 564. Output member 548 of the variator 540 rotatably couples to driveline 550, wherein the driveline 550 may include speed reduction gears 552, a transaxle and/or a differential gear set that rotatably couples to one or more drive wheels 570. Each of the drive wheels 570 and other vehicle wheels is preferably equipped with a controllable brake 572. The internal combustion engine 512 may be coupled to the input member 514 of the geartrain 520 via torque converter 513 and a third torque transfer clutch 528. The geartrain 520 preferably includes input member 514, meshed planetary gear set 530, a first torque transfer clutch 522, a second torque transfer clutch 524, the third torque transfer clutch 528 and an intermediate member 538, all of which is housed in transmission case 526 that is mounted onto a frame member or at another suitable location of the vehicle. The third torque transfer clutch 528 is able to decouple the internal combustion engine 512 from the input member 514 when deactivated. The planetary gear set 530 preferably includes ring gear 536, a plurality of planet gears and carrier 534, and sun gear 532. The ring gear 536 rotatably couples to the input member 514 and the sun gear 532 rotatably couples to the intermediate member 538.

The third torque transfer clutch 528 may be any suitable clutch, and is a multi-plate friction clutch in certain embodiments. The third clutch 528 disconnects engine torque from the geartrain 520 for operation in Neutral. The first and second torque transfer clutches 522, 524 are each dog clutches in this embodiment. A dog clutch is an intermeshing clutch that is able to couple rotation and torque transfer between two members by meshing complementary splines or protrusions of respective elements of the two members when their rotational speeds are synchronized, as is known by those skilled in the art. Dog clutches and the like are known to those skilled in the art. In one embodiment, the first and second torque transfer clutches 522, 524 are dog clutches that are packaged together and share a common carrier element 525 that is moveable. The moveable common carrier element 525 can be employed to selectively engage one or the other of the first and second clutches 522, 524. Use of the common carrier element 525 reduces packaging space and part counts.

The variator 540 is analogous to the variator 40 described with reference to FIG. 1, and includes a primary pulley 542 rotatably coupled to a secondary pulley 544 via a flexible continuous device 546 that transfers torque therebetween. The first pulley 542 rotatably attaches to the intermediate member 538 and the second pulley 544 rotatably attaches to the output member 548, and is adapted to transfer torque between the first and second pulleys 542, 544 and thus between the intermediate member 538 and the output member 548. In one embodiment, a hydraulic pump fluidly couples to elements of the variator 540 to supply pressurized hydraulic fluid via a hydraulic circuit in response to control signals that are communicated from the controller 560. The controller 560 is analogous to the controller 60 described with reference to FIG. 1. The controller 560 monitors signal inputs from an input speed sensor 516, an intermediate speed sensor 517, an output speed sensor 518 and a transmission range selector 562, and executes control routines to control activations of the first clutch 522, the second clutch 524 and the third clutch 528, and to control operation of the variator 540.

Operation of the geartrain 520 is analogous to the operation of geartrain 20 that is described with reference to FIGS. 2-1, 2-2 and 2-3. When the geartrain 520 is operating in a first state, the sun gear 532 and the ring gear 536 rotate in the same rotational direction such that the rotational direction of the intermediate member 538 is the same as the rotational direction of the input member 514. Operating the geartrain 520 in the first state includes operating with the first clutch 522 activated and with the second clutch 524 deactivated. As such, the output member 548 of the variator 540 rotates the driveline 552 to rotate the drive wheel(s) 570 to effect propulsion in a forward direction when the powertrain system 500 is employed on a vehicle. When the geartrain 520 is operating in a second state, the sun gear 532 and the ring gear 536 rotate in opposite rotational directions such that the rotational direction of the intermediate member 538 is opposed to the rotational direction of the input member 514. Operating the geartrain 520 in the second state includes operating with the first clutch 522 deactivated and with the second clutch 524 activated. As such, the output member 548 of the variator 540 rotates the driveline 552 to rotate the drive wheel(s) 570 to effect propulsion in a reverse direction when the powertrain system 500 is employed on a vehicle. When the geartrain 520 is operating in Neutral, the sun gear 532 is not rotating, and the ring gear 536 and the carrier 534 rotate in the same rotational direction. Operating the geartrain 500 in the neutral state includes operating with both the first clutch 522 and the second clutch 524 deactivated. As such, the intermediate member 538 is decoupled from rotation of the input member 514. The third clutch 528 permits operation that includes disconnecting engine torque from the geartrain 520, which facilitates having the first and second clutches 522, 524 be low drag clutches such as an SOWC.

The geartrain 500 operates in Neutral/Park by activating the second clutch 524 and deactivating the first and third torque transfer clutches 522 and 528. The geartrain 500 transitions from Neutral/Park to Reverse by activating the third clutch 528. The geartrain 500 transitions from Neutral/Park to Drive by deactivating the second clutch 524 and activating the first and third clutches 522, 528. The geartrain 500 transitions from Reverse to Drive by deactivating the second clutch 524 and activating the first clutch 522 with the third clutch 528 continuously activated. The geartrain 500 transitions from Drive to Reverse by deactivating the first and third clutches 522, 528, activating the second clutch 524 and then re-activating the third clutch 528.

The powertrain system described herein including the transmission that has a variator in combination with a geartrain employing one or more low drag, compact clutches such as is described herein may be advantageously employed on-vehicle. The combination may facilitate use of CVT technology by reducing packaging space and drag losses when compared with known technologies, while being responsive to operator shift commands.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A transmission disposed to transfer mechanical power between a prime mover and a driveline, comprising:
  a geartrain, a variator and a controller;
  the variator including a first pulley rotatably attached to a second pulley via a flexible continuous device, wherein the first pulley rotatably attaches to an intermediate member of the geartrain and the second pulley rotatably attaches to an output member that rotatably couples to the driveline;
  the geartrain including an input member, a planetary gear set, a first clutch, a second clutch and the intermediate member;
  wherein the second clutch is a low drag clutch,
  wherein the input member is rotatably coupled to the prime mover,
  wherein the planetary gear set includes a plurality of meshingly engaged elements, including a ring gear, a plurality of planet gears and carrier, and a sun gear, wherein the ring gear is rotatably coupled to the input member, and
  wherein the sun gear is rotatably coupled to the intermediate member,
  wherein the first clutch rotatably couples two of the meshingly engaged elements of the planetary gear set when activated, and
  wherein the second clutch grounds rotation of the carrier when activated; and
  the controller including a processor and an instruction set, the controller operatively connected to the variator, the first clutch and the second clutch, and in communication with a first sensor disposed to monitor rotational speed associated with the input member and a second sensor disposed to monitor rotational speed associated with the intermediate member, wherein the instruction set is executable to:

activate only the first clutch in response to a request to operate the driveline in a forward direction; and activate only the second clutch in response to a request to operate the driveline in a reverse direction.

2. The transmission of claim 1, wherein the second clutch comprises a selectable one-way clutch.

3. The transmission of claim 1, wherein the second clutch comprises a dog clutch.

4. The transmission of claim 1, further comprising a third clutch disposed between the prime mover and the input member, and wherein the first and second clutches comprise low drag clutches.

5. The transmission of claim 4, wherein the first and second clutches comprise dog clutches.

6. The transmission of claim 5, wherein the first and second clutches comprise dog clutches that are packaged together and share a moveable carrier element, and wherein the moveable carrier element selectively engages one or the other of the first and second clutches.

7. The transmission of claim 1, wherein the instruction set executable to activate only the first clutch in response to a request to operate the driveline in a forward direction further comprises the instruction set executable to deactivate the second clutch, and then activate the first clutch when the second sensor indicates a rotational speed of the intermediate member is less than a threshold speed.

8. The transmission of claim 1, wherein the instruction set executable to activate only the second clutch in response to a request to operate the driveline in a reverse direction further comprises the instruction set executable to activate the second clutch and deactivate the first clutch when the second sensor indicates a rotational speed of the intermediate member is less than a threshold speed.

9. The transmission of claim 1, wherein the instruction set executable to activate only the second clutch in response to a request to operate the driveline in a reverse direction further comprises the instruction set executable to deactivate the first clutch, and then activate the second clutch when the second sensor indicates a rotational speed of the intermediate member is less than a threshold speed.

10. The transmission of claim 9, further comprising a brake disposed on the driveline; wherein the instruction set is executable to apply the brake to control the intermediate member to a rotational speed that is less than the threshold speed.

11. The transmission of claim 9, further comprising the instruction set executable to control the variator to control the intermediate member to a rotational speed that is less than the threshold speed.

12. The transmission of claim 11, wherein the instruction set executable to control the variator comprises the instruction set executable to change operation of the variator to an overdrive condition.

13. The transmission of claim 1, wherein the instruction set executable to activate only the second clutch in response to a request to operate the driveline in a reverse direction further comprises the instruction set executable to deactivate the first clutch, and then activate the second clutch when elements of the second clutch are synchronized.

14. The transmission of claim 13, further comprising the instruction set executable to control the variator to control rotation of the intermediate member to synchronize the elements of the second clutch.

15. The transmission of claim 14, wherein the instruction set executable to control the variator to control the intermediate member to synchronize the elements of the second clutch comprises the instruction set executable to change operation of the variator to an overdrive condition.

16. A transmission disposed to transfer mechanical power between a prime mover and a driveline in response to input from a transmission range selector, comprising:

a geartrain, a variator and a controller;

the variator including a first pulley rotatably attached to a second pulley via a flexible continuous device, wherein the first pulley rotatably attaches to an intermediate member of the geartrain and the second pulley rotatably attaches to an output member that rotatably couples to the driveline;

the geartrain including an input member, a planetary gear set, a first clutch, a second clutch and the intermediate member, wherein the input member rotatably couples to the prime mover, and a third clutch disposed between the prime mover and the input member, wherein the first and second clutches comprise low drag clutches;

the controller including a processor and an instruction set, the controller operatively connected to the variator, the first clutch and the second clutch, and in communication with a first sensor disposed to monitor rotational speed associated with the input member, a second sensor disposed to monitor rotational speed associated with the intermediate member, and the transmission range selector;

the instruction set executable to:

activate only the first clutch in response to an input from the transmission range selector indicating a request for forward direction of travel; and activate only the second clutch in response to an input from the transmission range selector indicating a request for reverse direction of travel.

17. The transmission of claim 16, wherein the first and second clutches comprise dog clutches.

18. The transmission of claim 16, wherein the first and second clutches comprise dog clutches that are packaged together and share a moveable carrier element, wherein the moveable carrier element selectively engages one or the other of the first and second clutches.

* * * * *